Dec. 1, 1936.   R. N. BROWN   2,062,696
WORM GEAR BURNISHING MACHINE AND METHOD
Filed May 21, 1934    2 Sheets-Sheet 1
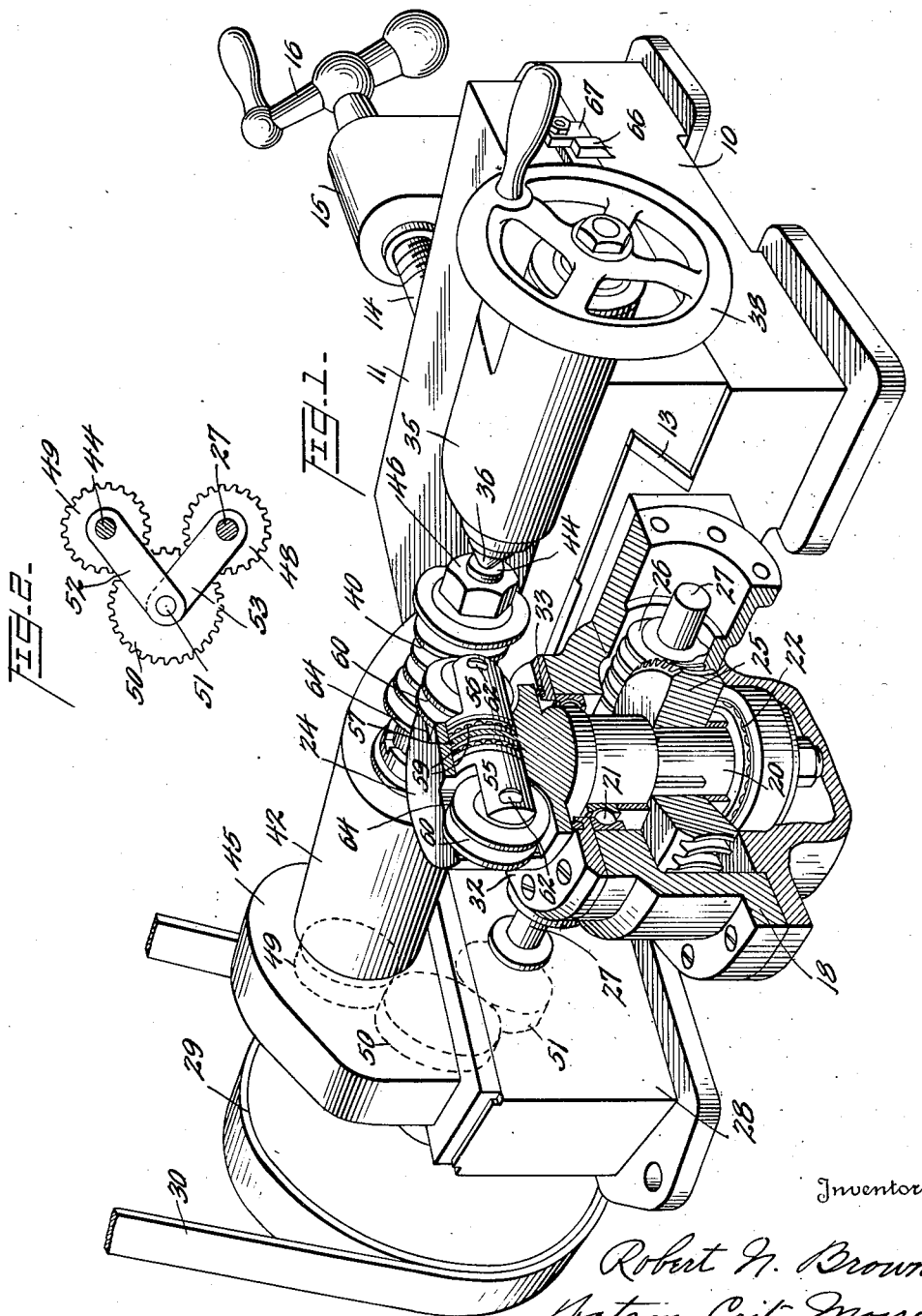

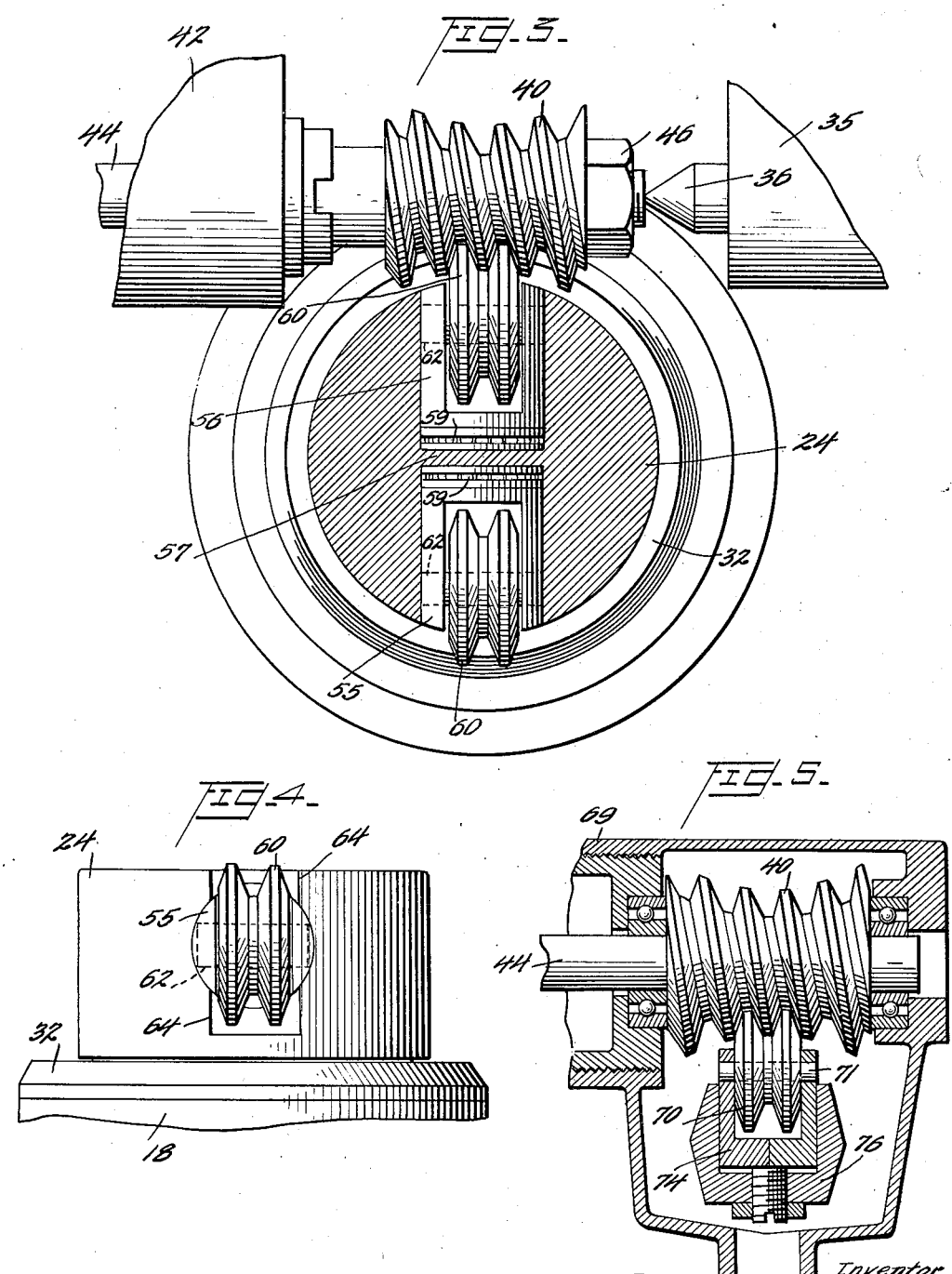

Patented Dec. 1, 1936

2,062,696

UNITED STATES PATENT OFFICE 2,062,696

WORM GEAR BURNISHING MACHINE AND METHOD

Robert N. Brown, Detroit, Mich., assignor to Packard Motor Car Company, Detroit, Mich., a corporation of Michigan Application May 21, 1934, Serial No. 726,813

18 Claims. (Cl. 29—90)

This invention relates to a method of and apparatus for burnishing worms, for instance worms such as are commonly employed in the steering gear of motor vehicles. In its preferred form the invention is applicable to the hour-glass type of worm and is more particularly intended for the burnishing of hour-glass worms which are designed for use with worm followers of the circumferentially ribbed roller type, this type of roller being frequently employed in lieu of the more conventional toothed worm gear or sector for the purpose of reducing friction in the steering gear.

It is of course essential that proper meshing of the roller with the worm be effected, and accurate and smooth finishing of both roller and worm is of the greatest importance. By the present invention it is possible to produce true and extremely smooth working surfaces on the worm and at the same time to harden and toughen these surfaces, the result of the burnishing operation being much more satisfactory in these respects than if grinding of the worm were resorted to. The invention contemplates the employment of one or more master rollers provided with one or more suitably hardened ribs adapted to mesh with the worm to be burnished, the worm and roller being caused to execute movements corresponding to those executed in actual use, pressure being simultaneously applied between the contacting surfaces.

In the formation of worms of the hour-glass type a cutter is commonly employed, this cutter being rotated about an axis transverse to the axis of the worm, rotation being simultaneously imparted to the worm on its own axis. While the present invention is not concerned with the method in which the teeth are formed on the worm prior to the burnishing operation, it is necessary for a description of the invention to refer to the axis about which the worm follower is rotated in the completed gearing as actually used, and obviously this axis should substantially coincide with the axis of rotation of a cutting tool which might be used to generate the worm. For convenience this axis will be referred to hereinafter as the generating axis.

Thus it is more specifically the object of the invention to provide a method of burnishing hour-glass worms and an apparatus for carrying out this method, the method comprising meshing the worm to be burnished with a circumferentially ribbed roller, the roller being supported for rotation on its own axis and about an axis substantially coinciding with the generating axis of the worm, rotating the worm on its own axis and the roller about the generating axis in timed relation while permitting the roller to rotate freely on its own axis, and simultaneously applying pressure between the contacting surfaces of the worm and roller.

In order to promote ease of understanding, the movement of the roller about the generating axis will be sometimes hereinafter referred to as "orbital" movement. In the construction illustrated in the drawings, the movement in question is truly orbital, since the axis of movement does not pass through the tool. However, it will be appreciated that if a single large tool were employed, the axis of movement in question might pass through the tool. In this case, the moveemnt of the working surface of the tool, in traversing the worm, would be truly orbital, while it could not be said that the movement of the entire tool were truly orbital. Nevertheless, it is intended to include the described movement within the term "orbital" as employed herein. The latter term is therefore defined, for present purposes, as including rotation of the tool about any axis other than its own, whether or not said axis passes through the tool, for the purpose of causing the tool to traverse the worm.

It is a further object of the invention to provide means for supporting a worm for rotation on its own axis and a roller for rotation on its own axis and about the generating axis of the worm, means for displacing the roller and worm relatively to apply pressure between the contacting surfaces thereof, and means for rotating the worm and for rotating the roller about the generating axis of the worm in timed relation independently of such displacement.

Further objects and features of the invention will be apparent from the following description taken in connection with the accompanying drawings, in which:

Figure 1 is a perspective view of a machine illustrating the principles of the invention and constituting the preferred embodiment thereof, certain portions of the machine being shown in section;

Figure 2 is a diagrammatic representation of gearing such as may be employed for interconnecting the worm and burnishing means for rotation in the proper timed relation;

Figure 3 is a plan view partly in section of a portion of the machine shown in Figure 1;

Figure 4 is an elevational view of the roller and the support therefor shown in Figure 3; and Figure 5 is a sectional view of one type of steering gear illustrating the manner in which the product of the machine disclosed herein may be employed.

In order to facilitate an understanding of the invention, the preferred embodiment thereof shown in the drawings is described herein specifically. It will nevertheless be understood that by the employment of detailed descriptive language no limitation of the scope of the invention is intended, various alterations of the structure and modifications of the method being contemplated.

The machine illustrated in Figure 1 of the drawings comprises a base 10 on which is mounted for sliding movement with respect thereto in one direction a support 11, the base and support carrying the burnishing means and the worm to be burnished respectively, the base and support being relatively displaceable so that the burnishing means and the worm may be moved into and out of engagement and the proper amount of pressure applied between the contacting surfaces thereof. Thus the support 11 and the base 10 may be provided with conventional cooperating guides 13, displacement being effected in the usual way by means of a threaded rod 14 supported for rotation and against axial displacement in a boss 15 rising from and formed integrally with the base 10, the rod 14 having threaded engagement with a portion of the support 11 to advance or withdraw the latter as the handle 16 which is secured to the rod 14 is rotated.

A gear housing 18 is secured to the base 10 and forms therewith a support for a generally vertical shaft 20, the shaft being journaled for rotation in the housing 18 by the bearing 21 and in the base 10 by the bearing 22. At its upper end the shaft 20 is secured to or formed integrally with a supporting member 24 for the burnishing means. Intermediate the ends thereof the shaft 20 is provided with a worm gear 25 which is secured to the shaft and which meshes with a worm 26 in turn secured to a shaft 27, the latter being journaled in any convenient manner for rotation in the housing 18 and being extended through a portion 28 of the base 10, the shaft 27 carrying at its outer end a pulley 29 which may be driven by a belt 30. The cover 32 may be secured to the housing and provided with suitable packing 33 engaging the lower portion of the member 24, whereby the gearing within the housing 18 may be packed with lubricant.

Secured to or formed integrally with the support 11 is a housing 35 in which is mounted a conventional centering member 36, the latter being axially movable in the housing upon rotation of the hand wheel 38 by mechanism customarily employed for this purpose. The centering member is adapted to engage one end of a shaft 44 on which the worm 40 to be burnished is secured in any convenient manner. Thus the worm may be keyed on the shaft 44 and retained thereon by means of a nut 46 threaded on the outer end of the shaft. The shaft 44 extends through a housing 42, which is formed, integrally with or secured to the support 11, and into a housing 45 which is likewise carried by the support 11.

The portion 28 of the base 10 through which the shaft 27 extends is formed as a chamber to receive a spur gear 48 which is secured to the shaft 27. A corresponding spur gear 49 is secured to the shaft 44, both of these gears meshing with a floating idler gear 50 carried on a shaft 51. In order that the meshing relationship of these gears may be maintained regardless of relative displacement of the base 10 and support 11, a link 52 is provided to pivotally connect the shafts 44 and 51 and a link 53 serves to similarly connect the shafts 51 and 27. It will be appreciated that this is a conventional form of pivoted gearing and that the employment of other types of pivoted gearing as a substitute for that shown herein is contemplated.

It will be seen that by means of this construction rotation of the pulley 29 serves to rotate the worm 40 and the supporting member 24 for the burnishing means in timed relation, it being understood that the axis of the shaft 20 and the supporting member 24 carried thereby coincides substantially with the generating axis of the worm when the latter is in mesh with the burnishing means as hereinafter explained.

The supporting member 24 for the burnishing means is preferably recessed from opposite sides to provide substantially cylindrical pockets receiving the correspondingly shaped elements 55 and 56, a web 57 forming the common base of these pockets and extending between the elements 55 and 56. Thrust bearings 59 may be interposed between each of the cylindrical elements and the web 57 to resist inward axial movement of the elements within their respective pockets.

The elements 55 and 56 are forked at their outer ends to receive master rollers 60 which are suitably hardened, each of these rollers being supported for rotation on its own axis, for instance by means of pins 62 extending through the rollers and through the forked portions of the respective elements 55 and 56. The member 24 is further provided with recesses 64 on each side thereof to receive and partly embrace the rollers 60, the recesses being sufficiently large to permit each roller and the cylindrical element which carries the same to partake of limited rotation about the axes of the cylindrical elements.

Ordinarily the common axis of the cylindrical elements 55 and 56 will be substantially perpendicular to the axis of the shaft 20 and will intersect the worm axis, the axes of the rollers 60 being substantially perpendicular to the axis of the cylindrical elements and lying generally in a common plane with the worm axis. Slight modifications of this arrangement may be employed where desirable or necessary.

In the preferred form of the invention the rollers 60 are illustrated as provided with two circumferential ribs, but it will nevertheless be appreciated that only one rib or a greater number of ribs may be employed. It will also be understood that the number of rollers carried on the supporting member 24 may be either less or greater than shown in the preferred embodiment.

The mode of operation of the machine will now be apparent. The worm to be burnished is secured to the shaft 44 and engaged by the centering member 36 through manipulation of the hand wheel 38. The handle 16 is then operated to advance the support 11 until the worm 40 meshes with one of the rollers 60, cooperating abutments 66 and 67 being provided on the base and support to limit the extent of advance of the latter and consequently the pressure which can be applied between the worm and the roller, one of these abutments being adjustable so that this pressure may be predetermined. The pulley 29 is then rotated to rotate the worm and the roller supporting member 24 in timed relation, the rollers successively engaging the worm and traversing the same. It will be appreciated that an automatic feeding device of any suitable nature may replace the manually operable handle 16 to advance the support 11 on the base 10 and to ensure the application of the correct amount of pressure throughout the burnishing operation. Under some circumstances it may be desirable to eliminate the gearing which interconnects the worm 40 and the support 24 for the burnishing means, only the worm being positively driven. Under these circumstances it is necessary either to reverse the direction of rotation of the worm periodically, employing a single burnishing roller which is traversed back and forth across the worm, or to employ a sufficient number of burnishing rollers to ensure that one will engage with the worm 40 as the preceding one leaves the worm. If this method is adopted, a suitable braking means may be applied to retard the movement of the member 24 and thus simulate actual operating conditions.

As the roller is traversed across the worm, it will be rotated on its own axis and about the axis of the cylindrical element 55 or 56 in which it is carried. Slight rotational movement of the cylindrical element is necessary since the helix angle of the worm 40 decreases from the central portion of the worm toward either end thereof, this being characteristic of the hour-glass type of worm and the obvious result of the normal method of forming such a worm by cutting as hereinbefore described. The slight rotational movement here referred to is not intended to fall within the definition of "orbital" movement hereinabove set forth, since the present movement is not a traversing movement, but is a mere incident to the traversing movement of the tool.

Figure 5 of the drawings illustrates the manner in which a worm burnished in accordance with the teachings of the present invention may be employed in practice, the worm being supported in the usual way at the lower end of the steering shaft in the steering housing 69 and meshing with a roller 70 which is supported for rotation on an axis 71 lying in a common plane with the worm axis in a carrier 74. The carrier is in turn rotatable about an axis perpendicular to the axis of the roller in an arm 76, this second rotational axis being provided to accommodate the roller to the varying helix angle of the worm as hereinbefore explained. The arm 76 constitutes in effect the equivalent of the usual worm gear and is supported for rotation about the generating axis of the worm, being connected in the conventional manner to the steerable road wheels of the vehicle. The structure shown in Figure 5 forms no part of the present invention and is only included to facilitate an understanding of the function of the worm and rollers.

Having thus described the invention, what is claimed as new and desired to be secured by Letters Patent is:—

1. In apparatus for burnishing worms of the hour-glass type, the combination with a circumferentially ribbed roller, of means for supporting the roller and a worm to be burnished in meshing relation, means for rotating in timed relation the worm on the axis thereof and the roller on an axis substantially coinciding with the generating axis of the worm, and means for simultaneously applying pressure between the contacting surfaces of said worm and roller.

2. In apparatus for burnishing worms, the combination with means supporting the worm to be burnished for rotation about the axis thereof, a master worm follower, means supporting said master follower for orbital movement about an axis transverse to and spaced from the axis of the worm, mechanism for relatively moving said worm supporting means and said follower supporting means to effect meshing of said worm and follower and to apply pressure between the contacting surfaces of the latter, and adjustable abutment means acting between both supporting means for limiting the relative movement of the latter, whereby the maximum pressure applied by said mechanism between said worm and follower may be predetermined.

3. In apparatus for burnishing worms of the hour-glass type, the combination with a circumferentially ribbed roller, means supporting said worm for rotation on the axis thereof, means supporting said roller for rotation about an axis substantially coinciding with the generating axis of the worm, driving means for rotating said worm, and mechanism for effecting relative displacement of the supporting means for said worm and roller to apply pressure between the contacting surfaces of the latter.

4. In apparatus for burnishing worms of the hour-glass type, the combination with a circumferentially ribbed roller, of means for supporting the roller and a worm to be burnished in meshing relation, means for rotating in timed relation the worm on the axis thereof and the roller on an axis substantially coinciding with the generating axis of the worm, and mechanism for effecting relative displacement of said supporting means to apply pressure between the contacting surfaces of said worm and roller.

5. In apparatus for burnishing worms of the hour-glass type, the combination with a circumferentially ribbed roller, of means for supporting the roller and a worm to be burnished in meshing relation, means for rotating in timed relation the worm on the axis thereof and the roller on an axis substantially coinciding with the generating axis of the worm, and mechanism for effecting relative displacement of said supporting means to apply pressure between the contacting surfaces of said worm and roller, said means for rotating said worm and roller including a driving connection therebetween comprising pivoted gearing, whereby rotation in timed relation of said worm and roller may be continued during relative displacement of said supporting means.

6. In apparatus for burnishing worms of the hour-glass type, the combination with a circumferentially ribbed roller, of means for supporting the roller and a worm to be burnished in meshing relation, means for rotating in timed relation the worm on the axis thereof and the roller on an axis substantially coinciding with the generating axis of the worm, and mechanism for effecting relative displacement of said supporting means to apply pressure between the contacting surfaces of said worm and roller, said means for rotating said worm and roller including a spur gear rotatable with said worm, a spur gear rotatable on an axis parallel to the axis of said first spur gear, spaced from the latter and operatively connected with said roller supporting means, a floating spur gear meshing with said first and second named spur gears, and links connecting said first and second named spur gears with said floating spur gear to maintain meshing relation thereof, whereby rotation in timed relation of said worm and roller may be continued regardless of relative displacement of said supporting means.

7. The method of burnishing a worm of the hour-glass type, which comprises meshing said worm with a circumferentially ribbed roller, rotating in timed relation the worm on the axis thereof and the roller on an axis substantially coinciding with the generating axis of the worm while supporting the roller for free rotation on its own axis, and simultaneously applying pressure between the contacting surfaces of said worm and roller.

8. The method of burnishing a worm of the hour-glass type, which comprises meshing said worm with a circumferentially ribbed roller, rotating in timed relation the worm on the axis thereof and the roller on an axis substantially coinciding with the generating axis of the worm while supporting the roller for free rotation on its own axis and on axes perpendicular to the generating axis and intersecting the axis of the worm, and simultaneously applying pressure between the contacting surfaces of said worm and roller.

9. In apparatus for burnishing hour-glass worms, the combination with a base, a support mounted on said base and displaceable with respect thereto, said support including a mounting for a worm to be burnished, driving means carried by said support for rotating said worm on the axis thereof, burnishing means engageable with said worm and mounted on said base, driving means for said burnishing means carried by said base for rotating said burnishing means to cause the latter to traverse said worm, mechanism for displacing said support on said base to engage and apply pressure between said worm and burnishing means, and gearing operable during displacement of said support for connecting said driving means.

10. In apparatus for burnishing hour-glass worms, the combination with a base, a support mounted on said base and displaceable with respect thereto, said support including a mounting for a worm to be burnished, driving means carried by said support for rotating said worm on the axis thereof, burnishing means engageable with said worm and mounted on said base, said burnishing means comprising a carrier rotatable on said base about an axis transverse to the axis of the worm and at least one circumferentially ribbed roller supported on said carrier for rotation on its own axis, driving means for said burnishing means carried by said base for rotating said burnishing means to cause the latter to traverse said worm, and mechanism for displacing said support on said base to engage and apply pressure between said worm and burnishing means.

11. In apparatus for burnishing hour-glass worms, the combination with a carrier supported for rotation about an axis substantially coinciding with the generating axis of the worm to be burnished, an element supported in said carrier for free rotation about an axis substantially perpendicular to the carrier axis and intersecting the axis of the worm, a circumferentially ribbed roller supported on said element for rotation about an axis substantially perpendicular to the axis of said element and intersecting the latter, said roller engaging said worm, and means for simultaneously applying pressure between the contacting surfaces of said worm and roller.

12. In apparatus for burnishing hour-glass worms, the combination with a carrier supported for rotation about an axis substantially coinciding with the generating axis of the worm to be burnished, an element supported in said carrier for free rotation about an axis substantially perpendicular to the carrier axis and intersecting the axis of the worm, a circumferentially ribbed roller supported on said element for rotation about an axis substantially perpendicular to the axis of said element and intersecting the latter, said roller engaging said worm, means supporting the worm for rotation about the axis thereof, means for rotating the carrier and worm in timed relation, and means for simultaneously applying pressure between the contacting surfaces of said worm and roller.

13. In apparatus for burnishing hour-glass worms, the combination with a carrier supported for rotation about an axis substantially coinciding with the generating axis of the worm to be burnished, a pair of elements supported in said carrier for free rotation about a common axis substantially perpendicular to the carrier axis and intersecting the axis of the worm, and rollers supported on said element for rotation about axes substantially perpendicular to the axis of said element and intersecting the latter, said rollers being alternately engageable with said worm, means supporting the worm for rotation about the axis thereof, and means for rotating the carrier and worm in timed relation.

14. In apparatus for burnishing gears, the combination with a support for a gear to be burnished, of a burnishing tool, supported for orbital movement, means for effecting relative displacement of said supports to bring said tool and the gear into operative relation and to apply pressure therebetween, and means for limiting the extent of relative displacement of said supports in the direction of pressure application.

15. In apparatus for burnishing gears, the combination with a support for a gear to be burnished, of a burnishing tool, supported for orbital movement, means for effecting relative displacement of said supports to bring said tool and the gear into operative relation and to apply pressure therebetween, and means for limiting the extent of relative displacement of said supports in the direction of pressure application, said last named means being adjustable to vary the extent of relative displacement of said supports, whereby the degree of pressure applied between said tool and gear may be predetermined.

16. In apparatus for burnishing worms of the hour-glass type, the combination with a circumferentially ribbed roller, of means for supporting the roller and a worm to be burnished in meshing relation, means for rotating in timed relation the worm on the axis thereof and the roller on an axis transverse to said worm axis, and means for simultaneously applying pressure between the contacting surfaces of said worm and roller.

17. In apparatus for burnishing gears, the combination with a support for a gear to be burnished, of a burnishing tool, supported for orbital movement, means for effecting relative displacement of said supports to bring said tool and the gear into operative relation and to apply pressure therebetween, and means for rotating said gear and said tool in timed relation, said last named means including pivoted gearing associated with one of said supports, said last named support being displaceable about the pivotal axis of said gearing, whereby rotation of said gear and tool may be continued during displacement of said support.

18. The method of burnishing a worm of the hour-glass type, which comprises meshing said worm with a burnishing tool, rotating in timed relation the worm on the axis thereof and the tool on an axis substantially coinciding with the generating axis of the worm while supporting the tool for free rotation on its own axis, and simultaneously applying pressure between the contacting surfaces of said worm and tool.

ROBERT N. BROWN.